United States Patent
Katayama (10) Patent No.: US 6,882,617 B1
(45) Date of Patent: Apr. 19, 2005

(54) MAGNETIC RECORDING MEDIUM AND METHOD OF RECORDING

(75) Inventor: Hiroyuki Katayama, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/647,734

(22) PCT Filed: Apr. 4, 1999

(86) PCT No.: PCT/JP99/01783

§ 371 (c)(1),
(2), (4) Date: Oct. 4, 2000

(87) PCT Pub. No.: WO99/52101

PCT Pub. Date: Oct. 14, 1999

(30) Foreign Application Priority Data

Apr. 6, 1998 (JP) .............................. 10-92127

(51) Int. Cl.[7] .................................. G11B 7/26
(52) U.S. Cl. ................. 369/288; 369/275.1; 369/13.07; 428/694 ML
(58) Field of Search .......................... 369/275.1, 275.2, 369/275.3, 275.4, 13.07, 288, 283, 13.42, 13.41, 13.4, 286; 360/126, 125, 106; 505/171; 428/64.3, 694 ML, 694 SC, 694 XS, 694 RE (56) References Cited

U.S. PATENT DOCUMENTS 4,996,621 A * 2/1991 Ruigrok et al. ............. 360/126
5,109,312 A * 4/1992 Kato et al. .................. 505/171

FOREIGN PATENT DOCUMENTS

| EP | 0 471 527 B1 | 2/1992 |
|---|---|---|
| JP | 50-151035 | 12/1975 |
| JP | 57189356 A | 11/1982 |
| JP | 01119901 A | 5/1989 |
| JP | 01-258204 | 10/1989 |
| JP | 03130904 A | 6/1991 |
| JP | 04255864 A | 9/1992 |
| JP | 04302836 A | 10/1992 |
| WO | WO 92/02931 | 2/1992 |

* cited by examiner

Primary Examiner—Ali Neyzari
(74) Attorney, Agent, or Firm—David G. Conlin; David A. Tucker; Edwards & Angell, LLP (57) ABSTRACT

In a method of recording and reproduction using a magnetic storage medium, a magnetic storage medium (5) is used in which at least magnetic recording film (2) and a superconducting film (3) are deposited. According to the method, the superconducting layer (3) is partly heated where data is either recorded in recording or reproduced in reproduction, using a semiconductor laser (6) to or beyond its critical temperature at which diamagnetism disappears. Thus, in recording, data can be recorded with high density without affecting adjacent parts of the magnetic recording layer regardless of the physical size of the magnetic head. In reproduction, data can be reproduced from a minuscule part at high S/N ratios with crosstalk from adjacent bits being substantially eliminated.

9 Claims, 4 Drawing Sheets

MAGNETIC RECORDING MEDIUM AND METHOD OF RECORDING

TECHNICAL FIELD

The present invention relates to magnetic storage media and methods of recording and reproduction using the same, in particular, to magnetic storage media capable of magnetically performing high density recording and reproduction by raising the temperature of the storage media and methods of recording and reproduction using the same.

BACKGROUND ART

We have recently seen increasing demands for memory devices with a large capacity to store multimedia information requiring increased bandwidth. Attempts are being made vigorously to increase the data density on, especially, rewritable optical and magnetic disks and magnetic tapes.

Japanese Laid-Open Patent Application No. 3-130904/1991 (Tokukaihei 3-130904; published on Jun. 4, 1991) discloses one of these technologies (conventional technology I) which is currently a focus of attention. In conventional technology I, data is stored on a magneto-optic storage medium in which a high temperature superconducting film and a perpendicularly magnetized recording film are stacked. To record data, a part of the superconducting film is heated beyond a critical temperature so that the diamagnetism disappears in that part of the superconducting film. This restricts the entry area through which magnetic fluxes extend into the perpendicularly magnetized recording film, and reduces the recording bit size accordingly. Thus, high density recording is effected.

Japanese Laid-Open Patent Application No. 4-176034/1992 (Tokukaihei 4-176034; published on Jun. 23, 1992) and Japanese International Publication for a Patent Application under PCT No. 6-500194/1994 (Tokuhyohei 6-500194; published on Jan. 6, 1994) disclose conventional technology II whereby data is magnetically recorded and reproduced with high density in narrow tracks by means of projection of assisting light onto the magnetic storage medium (hereinafter, will be referred to as light-assisted magnetic recording and reproduction technology). According to the technology, the storage medium is composed of a ferrimagnetic material that possesses a magnetic compensation temperature near room temperature. To record data, a laser beam is projected onto a track of the storage medium where data is to be recorded, raising the temperature of the recording layer in the track practically to the Curie temperature. Then, an external magnetic field is applied using a recording-use magnetic head, to effect the recording. To reproduce data, a laser beam is projected onto a track of the storage medium where data is to be reproduced, raising the temperature of, and thereby amplifying the magnetism in, the recording layer in the track. Then, the magnetic flux leaking from the recording layer is detected using a reproduction-use magnetic head, to effect the reproduction.

In the high density recording according to conventional technology I, the data stored in the perpendicularly magnetized recording film is reproduced by reading it either (1) by means of Kerr rotation effects caused by a laser projected onto the perpendicularly magnetized recording film from a source which is placed across the perpendicularly magnetized recording film from the superconducting film or (2) by means of magnetic flux leakage from the perpendicularly magnetized recording film detected using a reproduction-use magnetic head which is placed across the perpendicularly magnetized recording film from the superconducting film. Therefore, to reproduce high density data, either the laser beam or the magnetic pole of the reproduction-use magnetic head should be reduced in size to match the minuscule size of the recording bit.

Meanwhile, to read stored data using laser beams, a problem is encountered concerning refraction limits, where the lower limit of the beam size is dictated by the wavelengths of beams available for reproduction and the NA of an objective lens. Therefore, if a beam which is larger than the minuscule bit is used in reproduction, influence, i.e., crosstalk, from adjacent recording bits are difficult to keep under control. To reproduce data using a magnetic head, technical problems are encountered concerning microscopic fabrication of the magnetic pole in a magnetic head.

As described above, according to conventional technology I, it is difficult to reproduce signals with excellent S/N ratios while keeping influence, i.e., crosstalk, from adjacent recording bits.

According to conventional technology II based on the light-assisted magnetic recording and reproduction technology, the storage medium should be composed of an n-type ferrimagnetic material having a magnetic compensation temperature at room temperatures. Compared to those ferromagnetic materials used in ordinary magnetic recording without assisting light, the storage medium made of such a ferrimagnetic material exhibits only a fraction of residual magnetism in reproduction. Therefore, the storage medium cannot produce leaking magnetic fluxes that are sufficiently strong for detection by a magnetic head, resulting in insufficient signal strength and reduced S/N ratios in reproduction.

Besides, according to conventional technology II, residual magnetism, however small, does occur on a part of the surface of the storage medium where the above-mentioned requirement that the compensation temperature is at room temperatures is not fulfilled due to distribution of magnetic substances or any other reason. Leaking magnetic field produced by this residual magnetism is another cause of crosstalk, reducing S/N ratios in light-assisted magnetic reproduction as a result. As can be clearly understood from the description, a storage medium used according to the technology is required to have an extremely high degree of uniformity in composition. Also, in design, materials for the storage medium should be chosen from only a limited range of materials: no other materials but n-type ferrimagnetic materials that have a magnetic compensation temperature at room temperatures can satisfy conditions required in recording by the technology.

In view of the above problems, the present invention has an object to present magnetic storage media capable of performing high density data recording and reproduction and exhibiting excellent S/N ratios in reproduction, and also to present methods of recording and reproduction using the magnetic storage media.

DISCLOSURE OF THE INVENTION

A magnetic storage medium in accordance with the present invention is characterized in that it includes:

a magnetic recording layer;

a superconducting layer; and a thermal insulation layer, provided between the superconducting layer and the magnetic recording layer, for reducing heat transmitted from the superconducting layer to the magnetic recording layer.

According to the arrangement, thermal energy applied to heat the superconducting layer does not wastefully leak to the magnetic recording layer, achieving efficient heating of the superconducting layer. This eliminates the need to supply a large amount of energy from an external source (for example, a semiconductor laser) to heat the superconducting layer sufficiently, and alleviates reduction in magnetism in the magnetic recording layer due to a rise in temperature. As a result, the recording and reproduction device used with the magnetic storage medium has an increased power efficiency, and high density magnetic recording and reproduction of data can be effected using the magnetic storage medium.

The magnetic recording layer may be composed of a Co alloy, a perpendicularly magnetized artificial lattice, a perpendicularly magnetized amorphous alloy of rare earth and transition metals, or a similar material.

It is preferable if the superconducting layer is preferably composed of a high temperature superconductor oxide. The high temperature superconductor oxide may be selected from the group consisting of $LnBa_2Cu_3O_{7-\delta}$ (Ln is one of lanthanide elements such as La and Y; $0<\delta<1$), $Bi_2Sr_2Ca_{n-1}Cu_nO_y$ ($n \geq 1$), $Tl_mBa_2Ca_{n-1}Cu_nO_y$ (m=1 or 2, $n \geq 1$).

A method of recording and reproduction using a magnetic storage medium in accordance with the present invention is characterized in that a magnetic storage medium in which at least a magnetic recording layer and a superconducting layer are deposited is used; and the superconducting layer is partly heated where data is either recorded in recording or reproduced in reproduction, using heating means to or beyond a critical temperature at which diamagnetism disappears.

Another method of recording and reproduction using a magnetic storage medium in accordance with the present invention is characterized in that:

a magnetic storage medium in which at least a magnetic recording layer and a superconducting layer are deposited is used;

data is recorded in the magnetic recording layer by passing a signal magnetic field produced by a recording-use magnetic head through a part of the superconducting layer where the data is to be recorded and diamagnetism disappears; and data is reproduced from the magnetic recording layer by detecting, using a reproduction-use magnetic head, a magnetic flux leaking from the magnetic recording layer through a part of the superconducting layer where the data is to be reproduced and diamagnetism disappears.

According to the arrangement, to record or reproduce data, the magnetic storage medium is partly heated where data is recorded or reproduced; as a result, in this minuscule part of the superconducting layer, temperature is elevated to or beyond the critical temperature, and diamagnetism disappears, allowing magnetic fluxes to pass. Therefore, when data is to be recorded, the magnetic field produced by a recording-use magnetic head is allowed to reach the magnetic recording layer only through the minuscule part and is able to form a microscopic pattern of magnetic domains in the magnetic recording layer without affecting adjacent parts of the magnetic recording layer regardless of the physical size of the external magnetic field application means. Data is thus recordable in a minuscule part. In contrast, when data is to be reproduced, a magnetic flux leaking from the magnetic recording layer is allowed to be detected using the reproduction-use magnetic head only via the minuscule part in which diamagnetism disappears. Data is thus reproducible from a minuscule part. No magnetic flux flows through adjacent parts of the superconducting layer where diamagnetism is exhibited. This substantially completely eliminating crosstalk influence from adjacent bits, and enables reproduction of signals with excellent S/N ratios.

It is preferable to use a semiconductor laser device to heat the magnetic storage medium where data is to be either recorded or reproduced, in view of its compactness and power saving features. The recording-use magnetic head and the reproduction-use magnetic head may be a single thin film magnetic head playing the double roles. Alternatively, a thin film magnetic head may be used for recording, while a magnetic head including a magnetic resistance effect element may be used for reproduction.

For a fuller understanding of the nature of the invention, reference should be made to the ensuing detailed description taken in conjunction with the accompanying drawing.

BEST MODES FOR CARRYING OUT THE INVENTION

[Embodiment 1]

Figure 1:
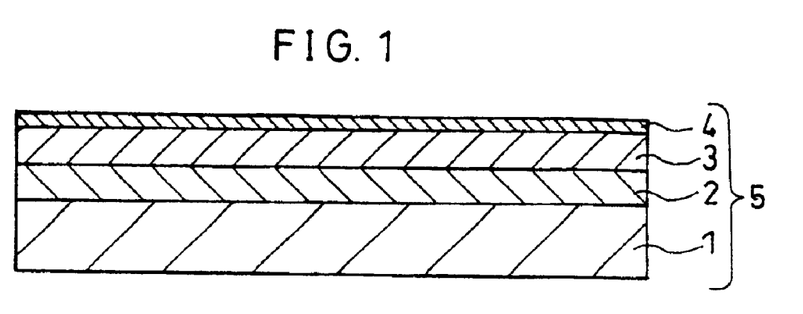
FIG. 1 is a cross-sectional view showing a magnetic storage medium of an embodiment in accordance with the present invention.
Figure 2:
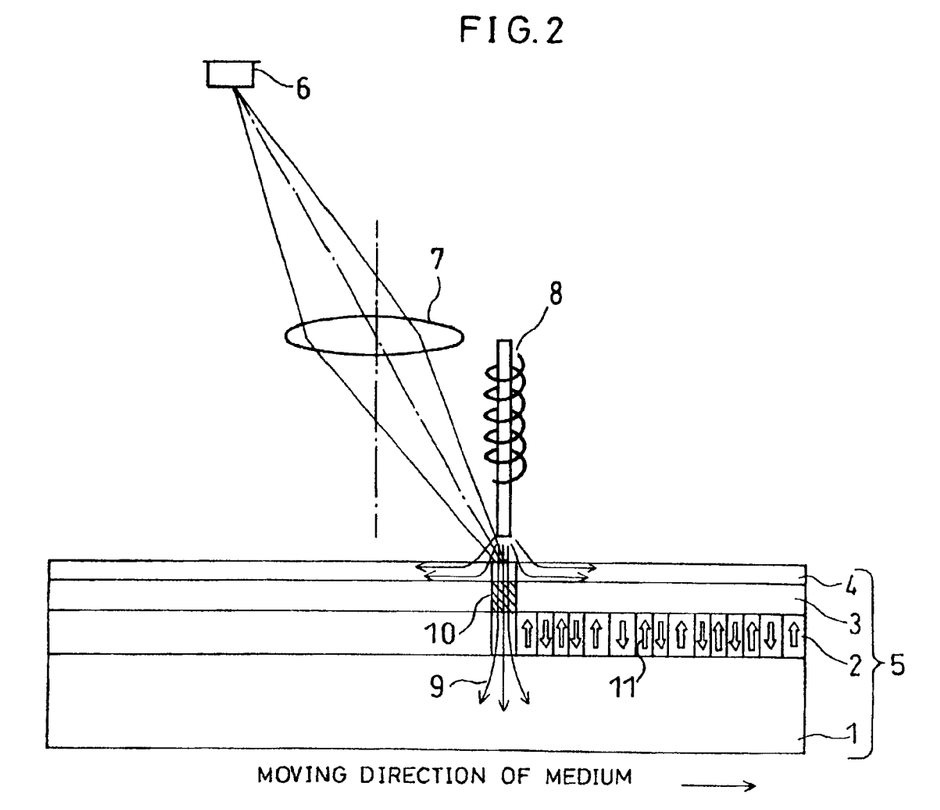
FIG. 2 is an explanatory drawing illustrating recording operations performed by the magnetic storage medium shown in FIG. 1.
Figure 3:
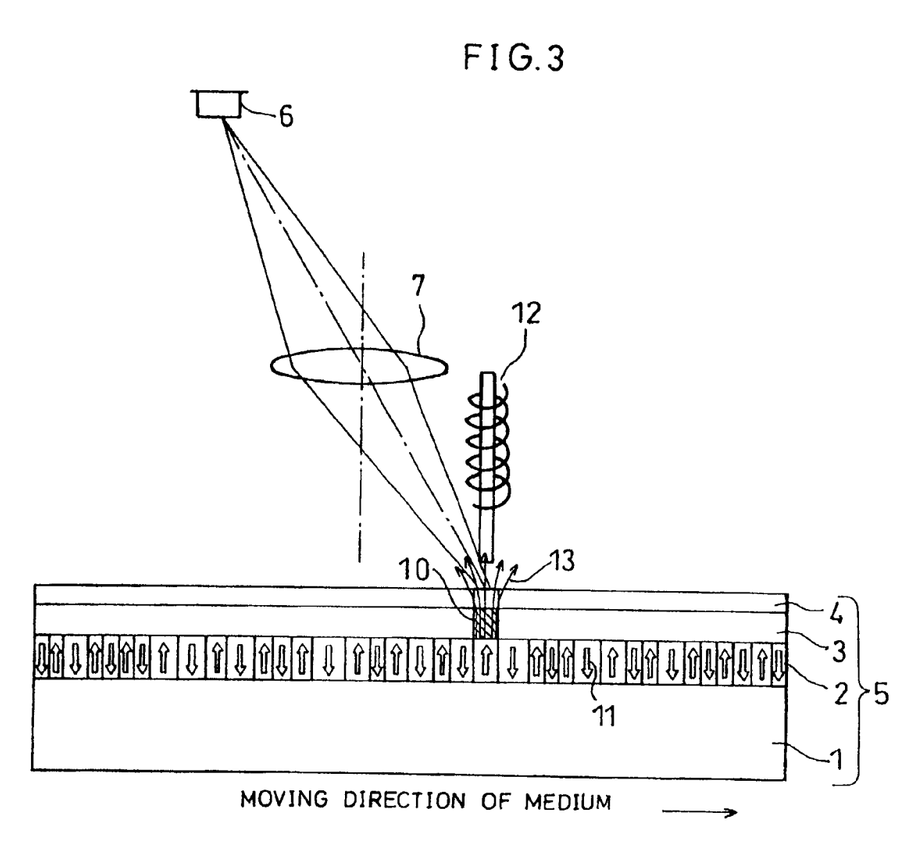
FIG. 3 is an explanatory drawing illustrating reproduction operations performed by the magnetic storage medium shown in FIG. 1.

Referring to FIG. 1 through FIG. 3, the following description will discuss an embodiment in accordance with the present invention.

As shown in FIG. 1, a magnetic storage medium 5 of the present embodiment includes a magnetic recording film (magnetic recording layer) 2, a superconducting film (superconducting layer) 3, and a protection film 4 being deposited in this order on a base substrate 1. Normally, a lubricating film, for example, a perfluoropolyether film or a similar liquid fluorine compound film, (not shown) is formed on the protection film 4 to ensure lubrication between the magnetic storage medium 5 and later-mentioned magnetic heads 8 and 12.

The magnetic recording film 2 is constituted by a perpendicularly magnetized film which is suitable to perform high density recording because of its less diamagnetic field. The perpendicularly magnetized film may be composed a Co alloy. Specific examples include ferromagnetic materials such as CoCr, CoCrPt, CoCrTa, and CoCrPtTa. Co alloys are insusceptible to environmental conditions and capable of producing a high level of reproduction output and reducing crosstalk.

Alternatively, the magnetic recording film 2 may be constituted by a perpendicularly magnetized artificial lattice film. A specific example is a ferromagnetic material composed of either Cr/Pt or Cr/Pd. When this is the case, compared to an n-type ferrimagnetic film of a rare earth and transition metal alloy conventionally used for a light-assisted magnetic recording film, the residual magnetization grows in the magnetic recording film, which amplifies reproduction signals. Further, since neither rare earth metals nor Fe that are readily oxidized is included, the magnetic recording film 2 boasts excellent insusceptibility to environmental conditions and overall reliability.

The superconducting film 3 may be composed of a high temperature superconductor oxide. Specific examples include $LnBa_2Cu_3O_{7-\delta}$ (Ln is one of lanthanide elements such as La and Y; $0<\delta<1$), $Bi_2Sr_2Ca_{n-1}Cu_nO_y(n \geqq 1)$, $Tl_nBa Ca_{n-1}Cu_nO_y$ (m=1 or 2, $n \geqq 1$). Any of these materials changes from normal conductivity to superconductivity or vice versa at 90K to 120K, and therefore does not require a large scale cooling device. It can be cooled down to operating ambient temperature at low cost by means of cooling using liquid nitrogen, and contributes to present a magnetic storage medium 5 which is highly reliable in high density recording.

The protection film 4 may be an amorphous C (carbon) film which exhibits good resistance to sliding movement of the magnetic heads 8 and 12, an amorphous C film with improved hardness as a result of addition of hydrogen, nitrogen, etc. or a DLC (Diamond Like Carbon) film. A DLC film has two prominent advantages, that is, high mechanical strength and self-lubrication, over the two other films.

The disk substrate (base substrate 1) may be an NiP-plated Al alloy substrate, a glass or crystallized glass substrate with a chemically enforced surface, or a single crystal sapphire substrate which enjoy's excellent chemical stability and mechanical properties. Any of these substrates exhibits excellent resistance to strong impact and has a highly flat surface, effecting high density magnetic recording and reproduction. Especially, a sapphire substrate enables, by means of its crystallinity, the control of crystal growth in the magnetic recording film 2 and the superconducting film 3.

Now, referring to FIG. 2 and FIG. 3, the following description will discuss a recording and reproduction scheme whereby signals can be reproduced with excellent S/N ratios from a high density magnetic storage medium 5 arranged as in the above.

A recording process will be explained in reference to FIG. 2.

To record data, light is emitted from a semiconductor laser (heating means) 6 and converged by a light convergent lens 7 so as to focus on a part of the magnetic storage medium 5 where data is to be recorded. The light heats the magnetic storage medium 5 and the superconducting film 3 locally (for example, within a diameter less than 1 $\mu$m). Thus, in a minuscule part 10, the superconducting film 3 is heated to or beyond its critical temperature and loses its diamagnetism. Thus, the minuscule part 10, but no other parts, gives passage to an external magnetic flux 9 which is produced by the recording-use magnetic head 8 and modulated according to recording signals.

Accordingly, when data is to be recorded, only a fraction of the magnetic fluxes produced in the recording-use magnetic head 8, which has passed through the minuscule part 10 where diamagnetism disappears, reaches the magnetic recording film 2. The locally heated part of the magnetic storage medium 5 may be modified into any given size, even below the laser diameter level, if temperature profile on the surface of the superconducting film 3 is changed through adjustment of the intensity of a laser. Hence, the recording can be performed at extremely high density.

Besides, since the semiconductor laser 6 is used as the heating means, the heating means is compact and consumes a reduced amount of power.

Next, a process to reproduce the above high-density-recording data is explained in reference to FIG. 3.

Similarly to the recording process, light is emitted from a semiconductor laser (heating means) 6 and converged by the light convergent lens 7 so as to focus on a part of the magnetic storage medium 5 where data is to be reproduced. The light heats the magnetic storage medium 5 and the superconducting film 3 locally (for example, within a diameter less than 1 $\mu$m). Thus, in a minuscule part 10, the superconducting film 3 is heated to or beyond its critical temperature and loses its diamagnetism. Thus, the minuscule part 10, but no other parts, gives passage to a leaking magnetic flux 13 from a recording bit 11 on the magnetic recording film 2 on which data is already stored. The reproduction-use magnetic head 12 detects the leaking magnetic flux 13 that has passed through the minuscule part 10. Hence, the reproduction can be performed. Under these conditions, those parts which are adjacent to the reproduced bit (minuscule part 10) allow no magnetic flux to leak therethrough, since they are under the influence of superconducting diamagnetism. Crosstalk from the adjacent bits is thereby substantially eliminated. Signals can be reproduced from high-density-recorded data without lowering S/N ratios.

The critical temperature of the superconducting film 3 may vary from part to part due to irregular distribution of components. According to the above arrangement, however, the adjacent parts do no allow passage to a laking magnetic flux if ambient temperature is specified sufficiently below the critical temperature. To achieve high recording density in conventional magnetic recording, the magnetic pole of a magnetic head must have a microscopic width (measured parallel to a track), which requires extremely difficult process technology. In contrast, no microscopic fabrication of magnetic material of this nature is necessary in the present invention, since the storage medium per se incorporates a function to eliminate crosstalk from adjacent bits.

To execute this magnetic recording and reproduction scheme, the Curie temperature of the magnetic recording film 2 needs to be equal to or above the critical temperature of the superconducting film 3, because if the Curie temperature is lower than the critical temperature, the data stored on the magnetic recording film 2 is erased in a reproduction process. Besides, the reproduction temperature should not exceed the Curie temperature of the magnetic recording film 2, again, to avoid erasure of data during a reproduction process.

It is preferable if the recording temperature is specified equal to or above the reproduction temperature. Especially, if the recording temperature is equal to the reproduction temperature, the semiconductor laser 6 serving as a heat source has only a single level of output that needs to be controlled. This facilitates design of its driver, and the resultant system is cheaper. Alternatively, the recording temperature may be specified higher than the reproduction temperature. In the event, if the coercive force of the magnetic recording film 2 is sufficiently reduced at the recording temperature, data can be recorded in a magnetic recording film exhibiting strong coercive force and high bit stability.

In FIG. 3, the laser beam projection system as locally heating means only includes the semiconductor laser 6 and the light convergent lens 7; additionally, an optical system including a focus servo and a tracking serve may be provided if necessary. Besides, since the semiconductor laser 6 is used as the light projector, the heating means is compact and consumes a reduced amount of power.

There are two ways for constituting the recording-use magnetic head 8 and the reproduction-use magnetic head 12. A single thin film magnetic head may be used serving for both recording and reproduction. Alternatively, the recording-use magnetic head 8 may be constituted by a thin film magnetic head, and the reproduction-use magnetic head 12 may be constituted by a magnetic resistance (MR) element. In the former, if the thickness of magnetic circuits is reduced, the inductance of the head can be reduced accordingly, and the head can perform high speed recording and reproduction. In the latter, magnetic circuits in the recording system and those in the reproduce system can be optimized separately. Besides, the use of an MR element enables extremely sensitive detection of a leaking magnetic flux and, hence, reproduction of high-density-recording data at high S/N ratios.

In the present embodiment, the magnetic recording film 2 is composed of either a Co alloy, which is a ferromagnetic material, or a perpendicularly magnetized artificial lattice. However, there are other alternatives available. For example, the magnetic recording film 2 may be composed of a non n-type (that is, P-, Q-, and R-types) ferrimagnetic amorphous alloy of rare earth and transition metals exhibiting strong perpendicular magnetic anisotropy, high coercive force, and perpendicular magnetization. Among such amorphous alloys of rare earth and transition metals, TbCo, TbFeCo, DyFeCo, GdTbFeCo, and GdDyFeCo imparts stability to recording bits because of the inclusion of Tb or Dy causing large perpendicular magnetic anisotropy. Further, being amorphous, these alloys are able to reduce medium noise due to grain boundaries which is a problem unique to conventional crystalline films. Crosstalk can be also reduced.

A further example for the magnetic recording film 2 is an in-plane magnetized film composed of a Co alloy (specifically, CoCr, CoNiCr, CoCrPt, CoCrTa, CoCrPtTa, CoCrPtTaNb, etc.) which was used conventionally for high density magnetic recording films. In the event, if a superconducting film is merely added to the structure of the medium used in an in-line magnetic recording system conventionally employed in a hard disk system, high density in-line magnetic recording can be performed with greatly reduced crosstalk without significantly changing the other systems including the structure of a magnetic head, head medium I/F, and signal processing system.

In the present embodiment, a laser beam projection system is used as means to heat a local part of superconducting film 3 is used. However, there are other alternatives available. For example, a minuscule heat generator may be used to serve the same purposes. The heat generator is provided in close proximity to the magnetic storage medium 5 and also to the magnetic heads 8 and 12, so that any given part of the rotating medium passes by the heat generator immediately before the magnetic heads 8 and 12.

[Embodiment 2]

Figure 4:
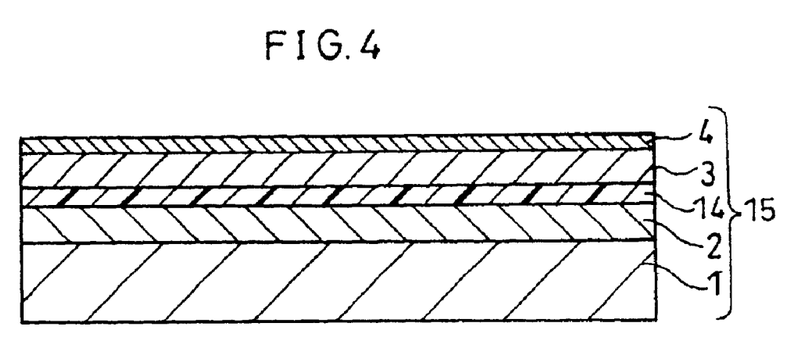
FIG. 4 is a cross-sectional view showing a magnetic storage medium of another embodiment in accordance with the present invention.

Now, in reference FIG. 4, the following description will discuss another embodiment in accordance with the present invention.

FIG. 4 shows a cross-section of a magnetic storage medium 15 of the present embodiment. For convenience, members illustrated in FIG. 4 that have the same arrangement and function as members illustrated in any one of FIGS. 1 through 3, and that are mentioned in that Figure are indicated by the same reference numerals and description thereof is omitted.

As shown in FIG. 4, the magnetic storage medium 15 includes a magnetic recording film 2, a non-magnetic insulation film (thermal insulation layer, non-magnetic insulation layer) 14, a superconducting film 3, and a protection film 4, the films deposited on a base substrate 1 in this sequence.

The non-magnetic insulation film 14 may be, for example, a dielectric film composed of SiN, AlN, AlSiN, AlTaN, SiAlON, TiN, TiON, BN, ZnS, $SiO_2$, $TiO_2$, $BaTiO_3$, or $SrTiO_3$. A preferred thickness is from 5 nm to 100 nm for the purposes of avoiding thermal interference between the superconducting film 3 and the magnetic recording film 2 and achieving small magnetic spacings between the magnetic recording film 3 and the magnetic heads 8 and 12 in favor of high density recording. The base substrate 1, magnetic recording film 2, superconducting film 3, and protection film 4 are composed of the same materials as those in embodiment 1 respectively.

The provision of the non-magnetic insulation film 14 separating the magnetic recording film 2 from the superconducting film 3 improves efficiency of, and restrains magnetic disturbance in, the heating of the superconducting film 3. The magnetic storage medium 15 therefore can be heated efficiently with only a reduced amount of power for the following reasons.

As the semiconductor laser 6 shines a laser beam onto the magnetic storage medium 15, the superconducting film 3 is heated by absorbing the laser beam. The absorbed heat is transmitted in the superconducting film 3 both along its thickness and along its surface (perpendicular to the thickness). Typically, the magnetic recording film 2, which is of a metal, has a heat conductance several times higher than the superconducting film 3, which is composed primarily of oxides. If the magnetic recording film 2 is deposited directly on the superconducting film 3 with no intervening substance therebetween, the heat transmitted along the thickness of the superconducting film 3 readily leaks to the magnetic recording film 2. The laser beam power should allow for this redundancy to heat the superconducting film 3 to a desired temperature. The heat transmitted to the magnetic recording film 2 not only heats the magnetic recording film 2, and but also readily fans out in the highly heat conductive magnetic recording film 2 along its surface. This unnecessarily expands hot areas in the magnetic recording film 2 where magnetization decreases and adversely affects signal reading.

In contrast, in the present embodiment, there is a non-magnetic insulation film 14 to restrain thermal interference between the magnetic recording film 2 and the superconducting film 3. Therefore, thermal energy does not leak from the superconducting film 3 to the magnetic recording film 2, efficiently heating the superconducting film 3. In other words, there is no longer the need to externally supply a large amount of energy from heating means (semiconductor laser 6), and the reduction in the magnetization in the magnetic recording layer 2 due to a rise in temperature is alleviated. As a result, the recording and reproduction device used with the magnetic storage medium 15 has an increased power efficiency, and high density magnetic recording and reproduction of data is effected using the magnetic storage medium 15.

As detailed in the foregoing, the magnetic storage medium in accordance with the present invention includes at least a magnetic recording film and a superconducting film on a base substrate.

According to the present invention, to record or reproduce data, the magnetic storage medium is locally heated so that the superconducting layer is hotter than its critical temperature. Therefore, data can be recorded in a minuscule part without affecting adjacent parts of the magnetic recording layer regardless of the physical size of the external magnetic field application means. High density recording is thus effected. Data can be reproduced from a minuscule part at high S/N ratios with crosstalk from adjacent bits being substantially eliminated.

If there is provided a non-magnetic insulation layer between the superconducting layer and the magnetic recording layer in the magnetic storage medium, the superconducting layer can be heated efficiently. The magnetic storage medium therefore can be suitably used to save power consumption during heating.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

INDUSTRIAL APPLICABILITY

The magnetic storage medium and the method of recording and reproduction using the same in accordance with the present invention is suitably used as a large capacity memory device to store multimedia information requiring increased broad bandwidth, for example, a magnetic disk, and a method of recording and reproduction using such a magnetic disk.

What is claimed is:

1. A magnetic storage medium, comprising:

a magnetic recording layer;

a superconducting layer; and a non-magnetic thermal insulation layer, provided between the superconducting layer and the magnetic recording layer, for reducing heat transmitted from the superconducting layer to the magnetic recording layer.

2. The magnetic storage medium as set forth in claim 1, wherein the magnetic recording layer is composed of a Co alloy.

3. The magnetic storage medium as set forth in claim 1, wherein the magnetic recording layer is composed of a perpendicularly magnetized artificial lattice.

4. The magnetic storage medium as set forth in claim 1, wherein the magnetic recording layer is composed of a perpendicularly magnetized amorphous alloy of rare earth and transition metals.

5. The magnetic storage medium as set forth in claim 1, wherein the superconducting layer is composed of a high temperature superconductor oxide.

6. A method of recording and reproducing using a magnetic storage medium in which at least a magnetic recording layer, a superconducting layer and a thermal insulation layer provided between the superconducting layer and the magnetic recording layer are deposited, wherein:

data is recorded in the magnetic recording layer by passing a signal magnetic field produced by a recording-use magnetic head through a part of the superconducting layer where the data is to be recorded and diamagnetism disappears; and data is reproduced from the magnetic recording layer by detecting, using a reproduction-use magnetic head, a magnetic flux leakage from the magnetic recording layer through a part of the superconducting layer where the data is to be reproduced and diamagnetism disappears.

7. The method of recording and reproducing a magnetic storage medium as set forth in claim 6, wherein:

diamagnetism in the superconducting layer disappears through heating by the heating means; and the heating means is semiconductor laser beam projection means.

8. The method of recording and reproducing a magnetic storage medium as set forth in claim 6, wherein either one of the recording-use magnetic head and the reproduction-use magnetic head is a thin film magnetic head.

9. The method of recording and reproducing a magnetic storage medium as set forth in claim 6, wherein the reproduction-use magnetic head is a magnetic resistance element.

* * * * *

UNITED STATES PATENT AND TRADEMARK OFFICE
CERTIFICATE OF CORRECTION

PATENT NO.      : 6,882,617 B1
DATED           : April 19, 2005
INVENTOR(S)     : Hiroyuki Katayama It is certified that error appears in the above-identified patent and that said Letters Patent is hereby corrected as shown below:

<u>Title page,</u>
Item [22], PCT Filed, please change the date to -- April 2, 1999 --.

Signed and Sealed this

Twelfth Day of July, 2005

JON W. DUDAS
*Director of the United States Patent and Trademark Office*